United States Patent
Asai et al.

(10) Patent No.: US 9,874,694 B2
(45) Date of Patent: Jan. 23, 2018

(54) PRODUCTION METHOD FOR MOUNTING STRUCTURE FOR GRATING ELEMENTS

(71) Applicant: NGK INSULATORS, LTD., Nagoya (JP)

(72) Inventors: Keiichiro Asai, Nagoya (JP); Shoichiro Yamaguchi, Ichinomiya (JP); Jungo Kondo, Miyoshi (JP); Naotake Okada, Anjo (JP); Tetsuya Ejiri, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/291,382

(22) Filed: Oct. 12, 2016

(65) Prior Publication Data
US 2017/0031097 A1 Feb. 2, 2017

Related U.S. Application Data

(63) Continuation of application No. PCT/JP2015/062189, filed on Apr. 22, 2015.

(30) Foreign Application Priority Data

May 7, 2014 (JP) .................................. 2014-096019

(51) Int. Cl.
| | | |
|---|---|---|
| B29D 11/00 | (2006.01) | |
| G02B 6/136 | (2006.01) | |
| G02B 6/124 | (2006.01) | |
| G02B 6/132 | (2006.01) | |
| G02B 5/18 | (2006.01) | |
| G02B 6/12 | (2006.01) | |

(52) U.S. Cl.
CPC .......... *G02B 6/136* (2013.01); *G02B 5/1857* (2013.01); *G02B 6/124* (2013.01); *G02B 6/132* (2013.01); *G02B 2006/12097* (2013.01)

(58) Field of Classification Search
USPC ........................................................ 216/24
See application file for complete search history.

(56) References Cited

U.S. PATENT DOCUMENTS

| 6,115,518 A | 9/2000 | Clapp |
| 7,016,391 B2 | 3/2006 | Takahashi |

(Continued)

FOREIGN PATENT DOCUMENTS

| JP | 04-010582 A1 | 1/1992 |
| JP | 10-078518 A1 | 3/1998 |

(Continued)

OTHER PUBLICATIONS

Miyakoshi et al., "Polymeric Wide-band Wave Plate Produced via Nanoimprint Subwavelength Grating," *Konica Minolta Technology Report*, vol. 2, 2005, pp. 97-100.

(Continued)

*Primary Examiner* — Roberts Culbert
(74) *Attorney, Agent, or Firm* — Burr & Brown, PLLC

(57) ABSTRACT

A plurality of Bragg gratings are formed at predetermined locations of a laminate including a mounting substrate, a clad layer provided on the mounting substrate and an optical material layer provided on the clad layer. Optical waveguides are formed each including at least each of the Bragg gratings. Masks are formed each covering a region corresponding to each of the grating elements on the optical material layer. The optical material layer and clad layer are etched to shape an end face of each of the grating elements.

10 Claims, 10 Drawing Sheets

(56) References Cited

U.S. PATENT DOCUMENTS

| | | |
|---|---|---|
| 7,590,318 B2 | 9/2009 | Accard et al. |
| 7,602,827 B2 | 10/2009 | Okuda |
| 8,921,133 B2 | 12/2014 | Yanagisawa |
| 2004/0020893 A1 | 2/2004 | Drake et al. |
| 2004/0105624 A1 | 6/2004 | Lee et al. |

FOREIGN PATENT DOCUMENTS

| | | |
|---|---|---|
| JP | 2002-277661 A1 | 9/2002 |
| JP | 2005-322849 A1 | 11/2005 |
| JP | 2008-160130 A1 | 7/2008 |
| JP | 2009-111423 A1 | 5/2009 |
| JP | 2013-016650 A1 | 1/2013 |
| WO | 01/69735 A1 | 9/2001 |
| WO | 2004-170685 A1 | 6/2004 |

OTHER PUBLICATIONS

"A Challenge to the Low-Cost Production of Highly Functional Optical Elements—Realization of Sub-Wavelength Periodic Structures via Glass-Imprinting Method," *Synthesiology*, vol. 1, No. 1 (2008), pp. 24-30.

Tomonobu Furuta, "Nanoimprint Technology and its Application to Optical Devices," Jun. 2007, pp. 54-61.

International Search Report and Written Opinion (Application No. PCT/JP2015/062189) dated Jul. 28, 2015.

English translation of International Preliminary Report on Patentability (Chapter I) (Application No. PCT/JP2015/062189) dated Nov. 17, 2016, 8 pages.

PRODUCTION METHOD FOR MOUNTING STRUCTURE FOR GRATING ELEMENTS

TECHNICAL FIELD

The present invention relates to a production method for a mounting structure for grating elements in which Brag gratings are utilized.

BACKGROUND ART

By mass-producing elements each in which optical waveguides are formed, it is desired to reduce manufacturing cost thereof. According to PATENT DOCUMENT 1, long and narrow stripe-shaped optical waveguides are cut out by sequentially film-forming a clad layer and an optical material layer on a silicon wafer, and subsequently etching the optical material layer. Then, optical waveguide elements each are separated on the silicon wafer by forming long and narrow grooves by etching, the grooves each reaching the silicon wafer after passing through the optical material layer and the clad layer. Next, the silicon wafer is divided along the foregoing grooves to obtain a number of optical waveguide element chips.

However, a method for forming a number of optical waveguide elements in which optical waveguides are formed, on a silicon wafer has been disclosed in PATENT DOCUMENT 1. But no method for forming a predetermined optical fine pattern in each optical waveguide element has been disclosed therein.

On the other hand, it has been considered that a nanoimprinting method is used as a method for forming diffraction gratings and Bragg gratings possessed by a semiconductor laser device. A method for producing the distributed feedback semiconductor laser using a nanoimprinting method has been disclosed in PATENT DOCUMENT 1. In this method, patterning a semiconductor layer for a diffraction grating of the distributed feedback semiconductor laser is carried out by the nanoimprinting method. Further, preparation of a sub-wavelength structure wide-band wave plate using a nanoimprinting method has been disclosed in each of NON-PATENT DOCUMENT 1 and NON-PATENT DOCUMENT 2. Further, it has been disclosed in NON-PATENT DOCUMENT 3 that a nanoimprint technology is applied to prepare optical devices. A wavelength selective element, a reflection controlling element, a moth-eye structure and so forth are exemplified as such optical devices.

CITATION LIST

Patent Document

PATENT DOCUMENT 1: JP 2002-277661A
PATENT DOCUMENT 2: JP 2013-016650A
PATENT DOCUMENT 3: JP 2009-111423A

Non-patent Document

NON-PATENT DOCUMENT 1: "KONICA MINOLTA TECHNOLOGY REPORT" Vol. 2 (2005) pages 97-100 "Polymeric Wide-band Wave Plate Produced via Nanoimprint Sub-wavelength Grating"
NON-PATENT DOCUMENT 2: "Synthesiology" Vol. 1, No. 1 (2008) pages 24-30 "A challenge to the low-cost production of highly functional optical elements—Realisation of sub-wavelength periodic structures via glass-imprinting process"
NON-PATENT DOCUMENT 3: Monthly DISPLAY June Issue (2007) pages 54-61 "Nanoimprint technology and its application to optical devices"

SUMMARY OF THE INVENTION

The present inventors have studied that optical elements making use of the function of a fine pattern are mass-produced by forming a number of optical elements on a wafer, the optical elements each in which an optical fine pattern is formed on the surface of an optical waveguide. As to such an optical fine pattern, a large number of types have been known, but a sub-wavelength structure wide-band wave plate, a wavelength selective element, a reflection controlling element, a moth-eye structure, a Bragg grating and so forth can be exemplified.

When forming various optical fine patterns applied for optical waveguides, it has been found that the optical action is deteriorated depending on the type of fine patterns, and desired emitted light is not obtained.

It is a problem to be solved by the present invention that the mass-production of optical elements possessing optical waveguides obtained by forming optically functional fine patterns can be achieved.

The present invention provides a method for producing a mounting structure comprising a mounting substrate and a plurality of grating elements provided over said mounting substrate. The method comprises the steps of:

forming a plurality of Bragg gratings at predetermined locations of a laminate comprising said mounting substrate, a clad layer provided on said mounting substrate and an optical material layer provided on said clad layer;

forming channel optical waveguides each including at least each of said Bragg gratings;

forming masks each covering a region corresponding to each of said grating elements on said optical material layer; and etching said optical material layer and said clad layer to shape an end face of each of said grating elements.

The present invention further provides a method for producing a mounting structure comprising a mounting substrate and a plurality of grating elements provided over said mounting substrate. The method comprises the steps of:

forming a plurality of Bragg gratings at predetermined locations of a laminate comprising said mounting substrate, a clad layer provided on said mounting substrate and an optical material layer provided on said clad layer;

forming channel optical waveguides each including at least each of said Bragg gratings;

forming a buffer layer on said optical material layer after said optical waveguides are formed;

forming masks each covering a region corresponding to each of said grating elements on said buffer layer; and etching said buffer layer, said optical material layer and said clad layer to shape an end face of each of said grating elements.

After cutting out optical elements via cutting processing of a wafer on which a number of optical elements are mounted, end faces of each optical waveguide of the optical element were tried to be subjected to a mirror polishing process. However, in the case of this method, the optical element is difficult to be handled, fixed and aligned, thereby resulting in mass-production at high costs.

For this reason, the present inventor has studied that various optical fine patterns are formed on an optical material layer; optical waveguides are subsequently formed by etching the optical material layer and a clad layer; and then each optical element is formed on a mounting substrate by etching. However, in this case, it has been found that the optical action is deteriorated depending on the type of fine patterns, and desired emitted light is not obtained.

For example, in cases where after forming a sub-wavelength grating structure in an optical material layer, optical waveguides were formed by etching the optical material layer and a clad layer to obtain an optical element, the finally obtained laser output was lowered by using the resulting optical element in combination with a semiconductor laser or an optical fiber to constitute a light source module.

In the case of the sub-wavelength grating structure, the period or depth of fine patterns becomes a size of about $\lambda/n$ (or $\lambda/neff$), and is significantly large, wherein the operating wavelength is designated as $\lambda$, and the refractive index of a material in which light having a wavelength $\lambda$ thereof propagates is designated as n (or effective refractive index neff). For this reason, light propagating an optical waveguide is scattered by this fine pattern, and radiated from the optical waveguide, thereby resulting in larger loss.

Herein, after forming Bragg gratings in an optical material layer, the present inventors obtained grating elements by etching the optical material layer and a clad layer to form optical waveguides, and subsequently separated the grating elements from each other by cutting a support substrate off to obtain chips. Then, it has been found that laser light having a desired wavelength is acquired with high output by using the resulting grating element in combination with a semiconductor laser, and thus reflection return light on the end face of the optical waveguide is specifically suppressed.

As to the present structure, the period Δ and depth of fine patterns are preferably ½ or less of $\lambda/n$ (or $\lambda/neff$) with respect to the refractive index n (or effective refractive index neff) of an optical material layer in propagation.

This means that the end face of the optical waveguide formed by etching becomes a mirror face moderately, and thus incident light from the semiconductor laser or the optical fiber is combined with the optical waveguide with high efficiency and the diffracted propagation light by Bragg gratings, which has been emitted in low reflectance is recombined with laser or an optical fiber with high efficiency. The end face formed by etching is inferior in specularity to the conventionally polished surface, but it appears that a phenomenon in which light reflected on this end face reenters the laser and the optical fiber, and is difficult to reenter the optical waveguide by moderately becoming a mirror face has occurred, and it is specifically indicated that this is suitable for producing grating elements.

EMBODIMENTS FOR CARRYING OUT THE INVENTION

Figure 1A:
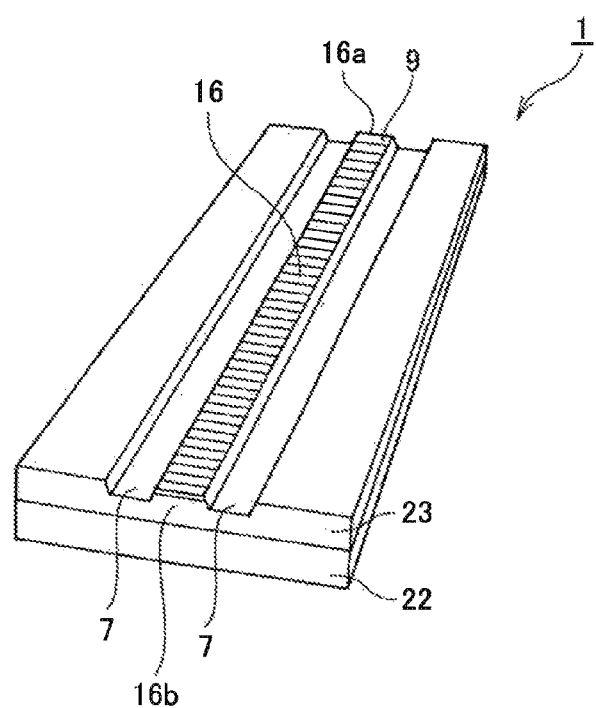
FIG. 1(a) is a perspective view showing a grating element 1.
Figure 1B:
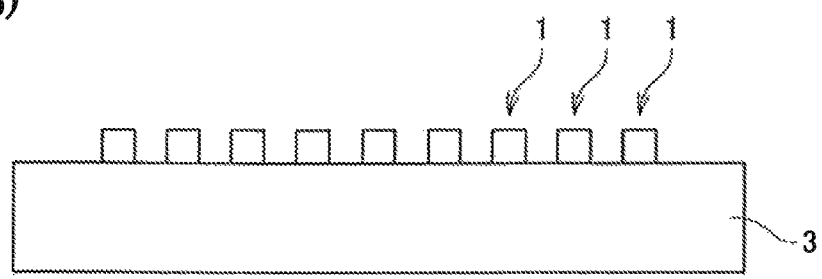
FIG. 1(b) is a schematic diagram showing a state where a number of grating elements 1 are mounted on a mounting substrate 3.

As shown in FIG. 1, in the present invention, a plurality of grating elements 1 are mounted on a mounting substrate 3. The number of grating elements 1 mounted on one mounting substrate 3 is not specifically limited. For example, a pair of ridge grooves 7 are formed in each grating element 1, and a ridge optical wave guide 16 is formed between the ridge grooves 7.

In the present example, Bragg gratings 9 are formed over the whole length of a ridge optical waveguide 16. However, an incident side propagating portion with no diffraction grating may be provided between the Bragg gratings 9 and an optical wave guide incidence plane 16a. Further, an emission side propagating portion with no diffraction grating may be provided between the Bragg gratings 9 and an optical wave guide emission plane 16b.

The method for producing a mounting substrate in the present embodiment will be further described.

Figure 2A:
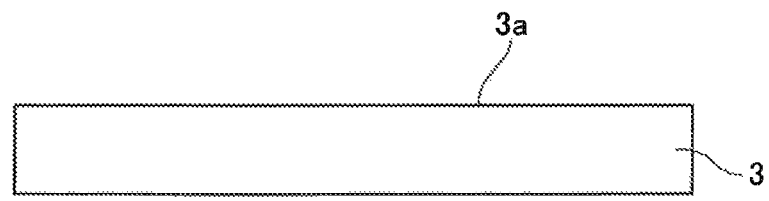
FIG. 2(a) is a front view schematically showing a mounting substrate 3.

As shown in FIG. 2(a), a mounting substrate 3 is prepared. a specific material for the mounting substrate is not particularly limited, and lithium niobate, lithium tantalate, AlN, SiC, ZnO, glass such as quartz glass or the like, synthetic quartz, quartz crystal, Si and so forth can be exemplified.

In terms of handling, the mounting substrate preferably has a thickness of 250 μm or more, and further, in terms of downsizing, the mounting substrate preferably has a thickness of 1 mm or less.

Figure 2B:
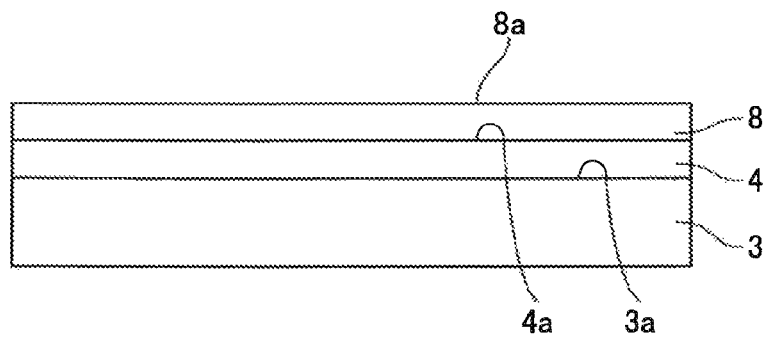
FIG. 2(b) is a front view showing a state where a clad layer 4 and an optical material layer 8 are formed on the mounting substrate 3.
Figure 2C:
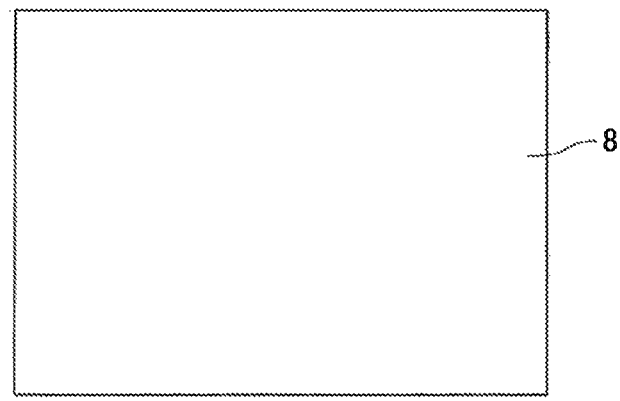
FIG. 2(c) is a top view of the mounting substrate 3 on which the clad layer 4 and the optical material layer 8 are formed.

Next, as shown in FIGS. 2(b) and 2(c), a clad layer 4 is formed on the upper surface 3a of the mounting substrate 3, and an optical material layer 8 is subsequently formed on the upper surface 4a of the clad layer 4. A symbol 8a represents the upper surface of the optical material layer 8.

Herein, the clad layer is formed of a material having a lower refractive index than that of a material of the optical material layer, but may be formed of silicon oxide, tantalum oxide and zinc oxide, for example. Further, the clad layer can be doped therewith to adjust the refractive index. P, B, Al and Ga can be exemplified as such a dopant.

In cases where a clad layer is provided, leaking of propagation light to a support substrate is suppressed by increasing thickness of the clad layer, and thus from this viewpoint, the clad layer preferably has a thickness of 0.5 yon or more.

The optical material layer is preferably formed from an optical material such as silicon oxide, zinc oxide, tantalum oxide, lithium niobate, lithium tantalate, titanium oxide, aluminum oxide, niobium pentoxide, magnesium oxide or the like. Further, the optical material layer preferably has a refractive index of 1.7 or more, and more preferably has a refractive index of 2 or more.

In order to further improve optical damage resistance of the optical waveguide, at least one kind of metal element selected from the group consisting of magnesium (Mg), Zinc (Zn), scandium (Sc) and indium (In) may be contained in the optical material layer, and in this case, magnesium is specifically preferable. Further, a rare earth element may be contained in a crystal as a doping component. Nd, Er, Tm, Ho, Dy and Pr are specifically preferable as the rare earth element.

Thickness of the optical material layer is not specifically limited, but a thickness of 0.5-3 µm is preferable in terms of reducing a propagation loss of light.

The optical material layer and the clad layer may be film-formed by a thin film forming method. Sputtering, vapor deposition, chemical vapor deposition (CVD), and metal organic chemical vapor deposition (MOCVD) may be exemplified as such the thin film forming method.

Figure 3A:
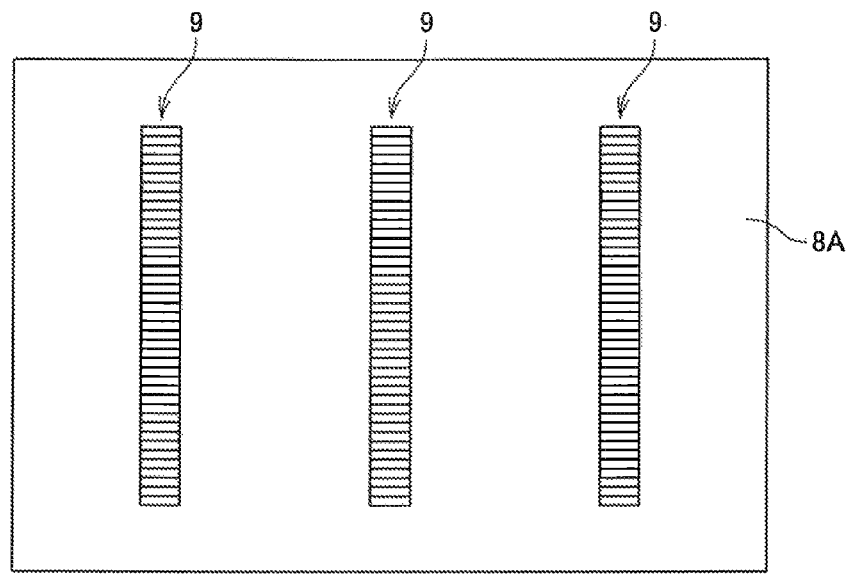
FIG. 3(a) is a plan view showing a state where Bragg gratings 9 are formed in an optical material layer 8A.
Figure 3B:
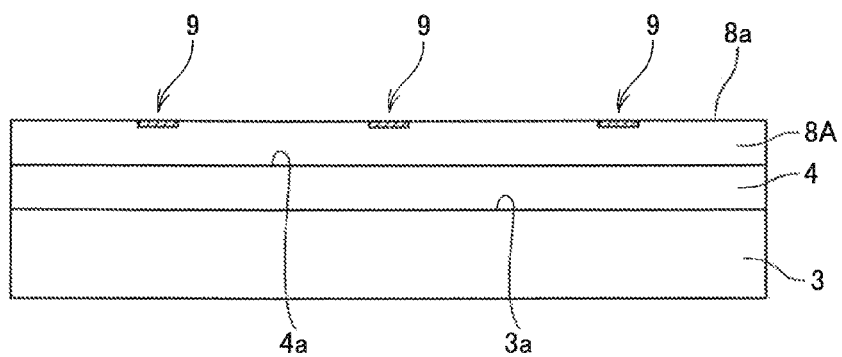
FIG. 3(b) is a front view showing a state where the Bragg gratings 9 are formed in the optical material layer 8A.

Next, as shown in FIG. 3, Bragg gratings 9 are formed in the optical material layer to obtain the optical material layer 8A having the Bragg gratings 9 therein. The forming position of each of the Bragg gratings is designed to be aligned in advance at an aimed forming position of each of waveguides in each grating element.

In the present invention, the forming method and the structure of Bragg gratings 9 are not specifically limited, patterning thereof can be formed by electron beam drawing (EB drawing), a stepper, nanoimprinting or laser direct exposure. However, from a mass-production point of view, Bragg gratings are preferably formed by the nanoimprinting method.

Figure 4A:
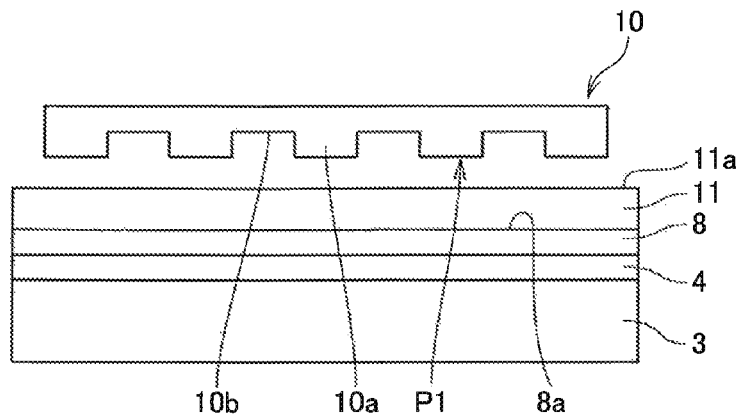
FIG. 4(a) shows a state where a mold 10 is placed above a resin layer 11.

The nanoimprinting method will be carried out as follows, for example. That is to say, for example, as shown in FIG. 4(a), a resin layer 11 is formed on the surface 8a of the optical material layer 8, and the molding surface of a mold 10 is faced to the surface 11a of the resin layer 11A. A design pattern P1 is provided on the molding surface of the mold 10. In the present example, the design pattern P1 is composed of groove portions 10b and bump portions 10a which are alternately formed at fixed periods.

Figure 4B:
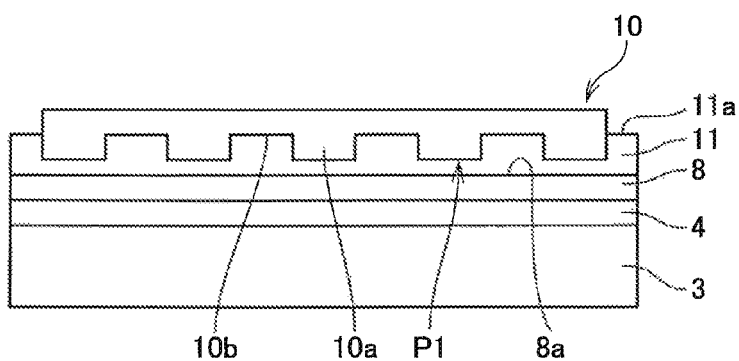
FIG. 4(b) shows a state where pressure is applied onto the resin layer 11 by the mold 10.
Figure 4C:
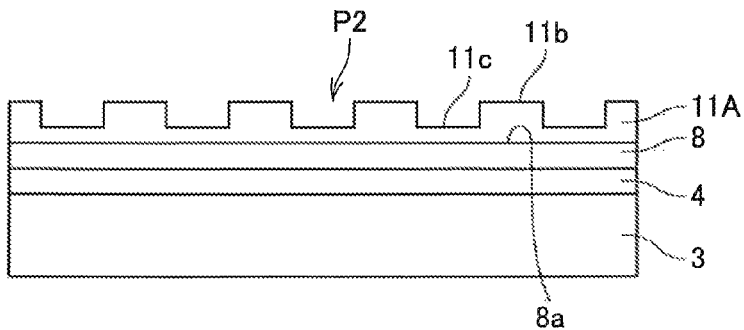
FIG. 4(c) shows a state where a design pattern P2 is transferred to a resin layer 11A.

When transferring the design pattern P1 of the mold 10, as exemplified in FIG. 4(b), the molding surface of the mold 10 is brought into contact with the resin layer 11, and the design pattern P1 is transferred to the resin layer. Then, the mold is peeled from the resin layer, and as shown in FIG. 4(c), transfer pattern P2 composed of bump portions 11b and groove portions 11c are formed in the resin layer 11A.

When imprinting is carried out, in the case where the resin layer 11 is formed of a thermoplastic resin, the resin layer is softened by heating the resin layer 11 to a temperature equal to or higher than a softening point of the resin, and the resin can be deformed by pressing the mold. The resin layer 11A is cured by cooling after this. In the case where the resin layer 11 is formed of a thermosetting resin, the resin is deformed by pressing the mold to an uncured resin layer 11, and can be subsequently cured by heating the resin layer to a temperature equal to or higher than a polymerization temperature of the resin. In the case where the resin layer 11 is formed of a photo curable resin, deformation is produced by pressing the mold to the uncured resin layer 11; the design pattern is transferred thereto; and curing can be carried out by exposing the resin layer to light.

After transferring the design patterns to the resin layer, fine patterns are molded onto the optical material layer by etching. In this case, the resin layer can be masked, but a mask material layer as another one can be also provided between the resin layer and the optical material layer.

Figure 5A:
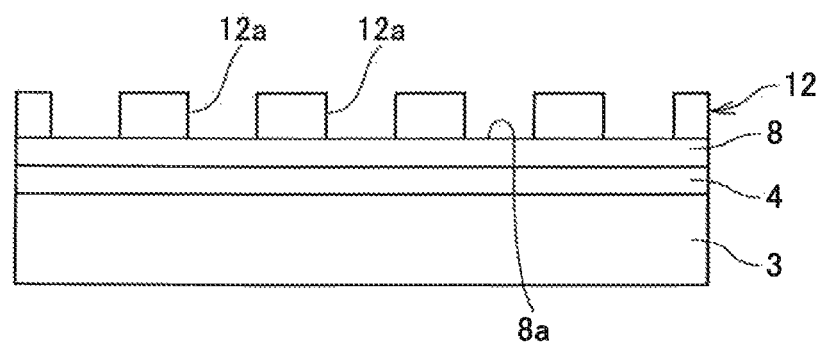
FIG. 5(a) shows a state where a resin mask 12 is formed.

First, the case where the resin layer is utilized as a mask will be described. As shown in FIG. 4(c), a resin remains at the bottom of each groove portion 11c of the resin layer 11A. This remaining resin is removed therefrom by ashing, and the form shown in FIG. 5(a) is taken. In FIG. 5(a), a number of through-holes 12a are formed in a resin mask 12, and the surface 8a of an optical material layer 8 is exposed to the bottom of each of these through-holes 12a. Next, the resin mask 12 as a mask is subjected to etching, and the optical material layer 8 is partly removed therefrom to form groove portions 15. Areas immediately below the resin mask 12 are not subjected to etching, and thus they remain as bump portions 14 {FIG. 5(b)}.

Figure 5B:
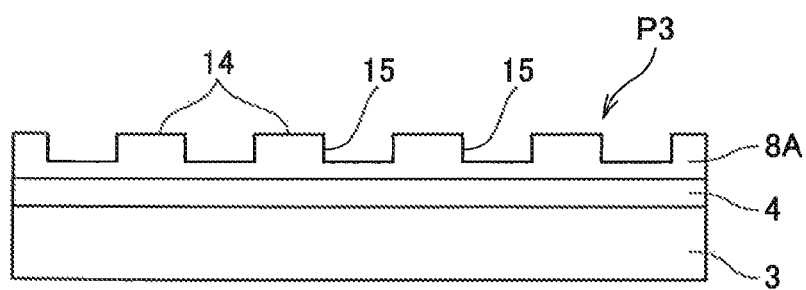
FIG. 5(b) shows a state where a pattern P3 of Bragg gratings is formed in an optical material layer 8A.

Next, the resin mask is removed therefrom to obtain the optical material layer 8A as shown in FIG. 5(b). A Bragg grating pattern P3 is composed of bump portions 14 and groove portions 15 which are periodically formed have been formed in the optical material layer 8A.

Further, the case where another mask material layer is provided between the resin layer and the optical material layer will be described. In this case also, as previously mentioned, the design pattern is transferred to the resin layer. Next, the resin remaining at the bottom of the groove portion of the resin layer is removed therefrom by ashing to expose the mask material layer as a base thereto. It follows that the mask material layer is exposed to a space through the through-hole formed in the resin layer.

Cr, Ni, Ti, WSi, and Al and multilayer films thereof can be exemplified as material for the mask material layer.

Next, the mask material layer is subjected to etching, and a number of through-holes are formed in the mask material layer depending on the design pattern to obtain a mask. Next, the material of the optical material layer immediately below the through-hole of the mask is removed therefrom by etching, and groove portions 15 as shown in FIG. 5(b) are formed. A support substrate remains unchanged as it is immediately below the mask to form bump portions 14. Subsequently, the unnecessary resin layer and mask are removed therefrom to obtain the optical material layer 8A shown in FIG. 5(b).

Dry-etching and wet-etching are exemplified as the method for etching the optical material layer.

Examples of the dry etching include reactive etching and so forth, for example, and as gaseous species, fluorine based and chlorine based ones may be exemplified.

As to the wet etching, for example, hydrofluoric acid based and TMAH based ones can be exemplified.

Next, optical waveguides each including the Bragg grating are formed in the optical material layer. The optical waveguide is preferably a ridge optical waveguide, but may be a proton exchange optical waveguide, a Ti-diffused optical waveguide or the like. Further, the optical waveguide may also be a slab optical waveguide.

Figure 6A:
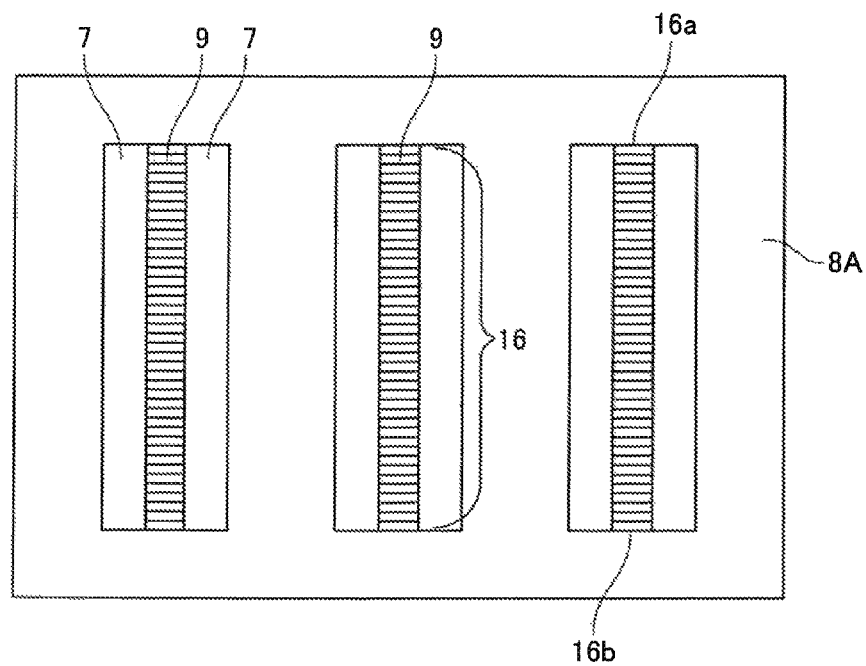
FIG. 6(a) is a plan view showing a state where ridge optical waveguides 16 and ridge grooves 7 are formed.
Figure 6B:
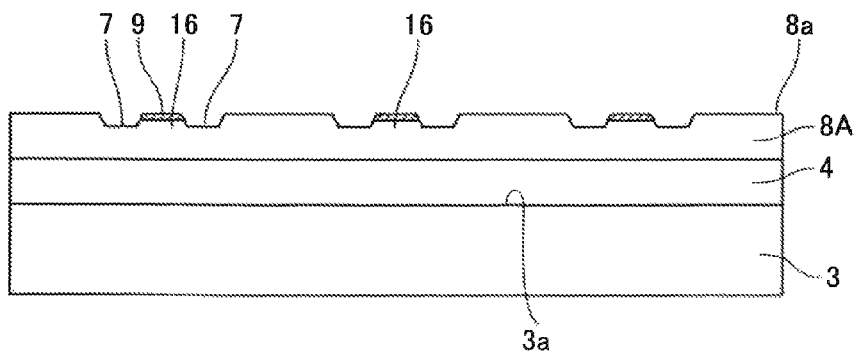
FIG. 6(b) is a cross sectional view schematically showing a state where the ridge optical waveguides 16 and the ridge grooves 7 are formed.

For example, in the example of FIG. 6, a pair of ridge grooves 7 are formed in the optical material layer, and a ridge optical waveguide 16 is formed by a pair of the ridge grooves 7. In the present example, Bragg gratings 9 are formed over the whole length of the ridge optical waveguide 16. The method for forming such a ridge optical waveguide is not limited, and a photolithography method using a mask aligner, a laser ablation method, grinding processing, and a nanoimprinting method can be exemplified.

Next, a mask is formed at an area corresponding to each of grating elements, and an optical material layer is covered by the mask. For example, in the example of FIG. 7, each of masks 18 is formed in the predetermined region on the optical material layer 8A to cover each of corresponding element regions. The optical waveguide and Bragg grating for each mask are configured to be located under each of the masks 18.

Figure 8A:
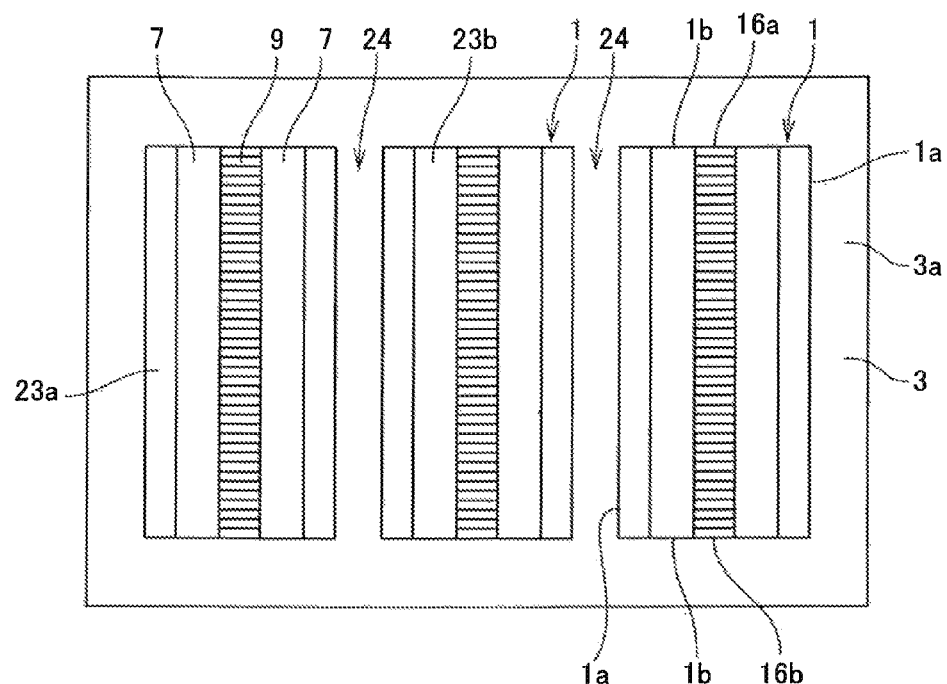
FIG. 8(a) is a plan view schematically showing a state where the external shape of each of grating elements is formed by etching.
Figure 8B:
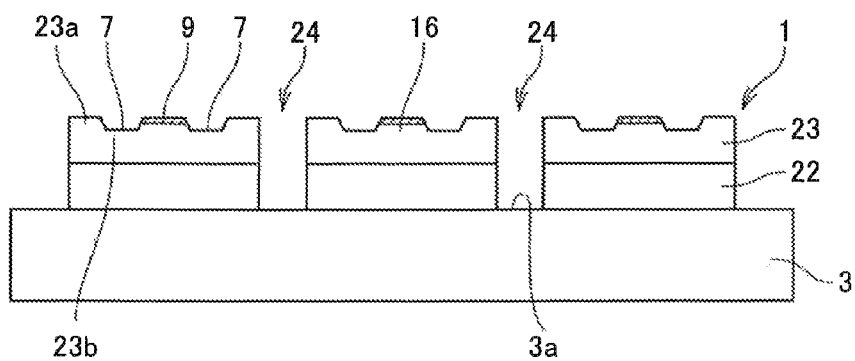
FIG. 8(b) is a cross sectional view schematically showing a state where the external shape of each of the grating elements is formed by etching.

Next, regions which are not covered by masks are removed therefrom by etching to mold grating elements. For example, portions of the optical material layer 8A and the clad layer 4, which are not covered by the masks 18 are removed therefrom by etching to form clearances 24 as shown in FIG. 8. From this result, the side face 1a and the end face 1b of each of grating elements 1 are shaped, and the optical material layer 23 and the clad layer 22 are also shaped. Symbol 23b represents a thin layer portion under each of ridge grooves, and symbol 23a represents an extension part provided on the outside of each thin layer portion.

A plurality of the present grating elements 1 are formed on a mounting substrate 3, and a clearance 24 is formed between the grating elements 1 adjacent to each other. In the present example, the surface 3a of the mounting substrate 3 is exposed to the clearance 24, and the exposure surface 3a exposed to the clearance 24 is a flat surface. In addition, three grating elements are shown in the present example, but the large number of grating elements formed on one mounting substrate is not limited, and follows design specifications.

A preferable method for etching such a grating element is as follows. For example, Dry etching such as reactive etching or the like may be exemplified, and as gaseous species, fluorine based and chlorine based ones may be exemplified.

It has been found that nearly the same processing surface as in the case where each end face of the optical waveguide is subjected to end face mirror polishing can be formed by cutting out the end face of the grating element by etching without subjecting the end face to mirror polishing or optical polishing.

An angle of such an optical waveguide end surface with respect to the optical axis is preferably 90°±10°.

In a preferable embodiment, on a mounting substrate, provided is a clearance between grating elements adjacent to each other, and the surface of the mounting substrate, which is exposed to the clearance, is a flat surface. In this case, the grating elements adjacent to each other can be separated from each other at any place of this clearance, and thus plane dimensions of the grating element are not required to be matched to deforming plane dimensions of a mounting substrate chip joined to the foregoing. Accordingly, processing allowance during etching of the grating elements can be improved, thereby leading to reduction of manufacturing costs.

In a preferable embodiment, after forming the end face of each grating element, an upper side clad layer is formed on the upper surface of the grating element, and a single layer film is formed on the end face of the grating element.

When forming the end face of the element by etching, it is possible to form the side face of the element at the same time. Thus, there appears a structure in which grating elements are interspersed in island shapes, and stress caused by formation of grating elements can be relaxed, thereby enabling formation of a wafer having reduced warpage.

Figure 9A:
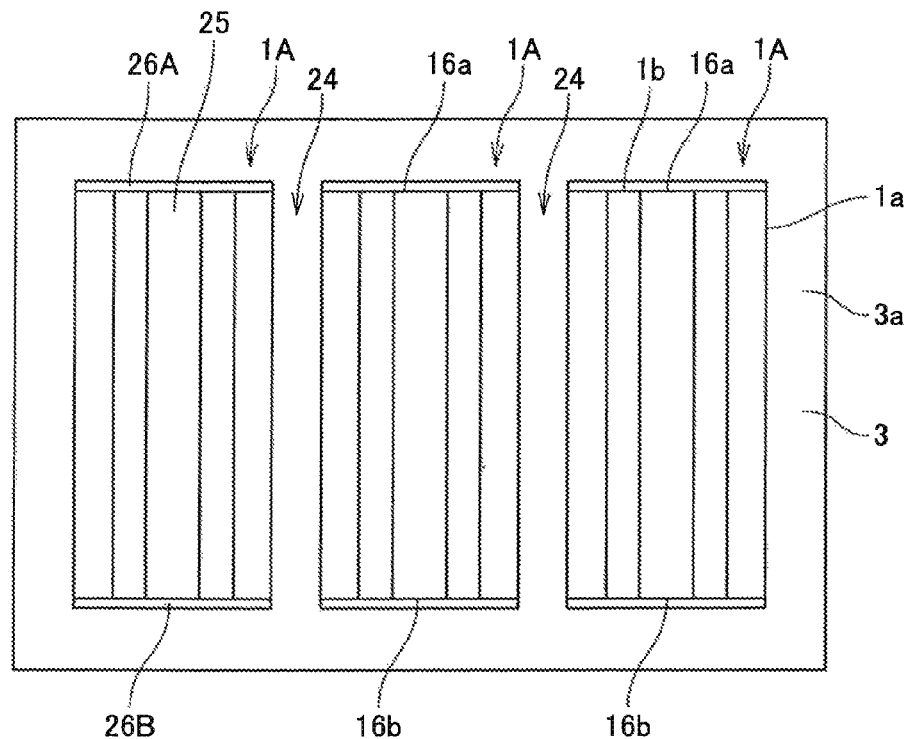
FIG. 9(a) is a plan view showing a state where an upper side buffer layer is formed on the upper surface of each of grating elements, and single layer films 26A and 26B are formed on end faces of each of optical waveguides.
Figure 9B:
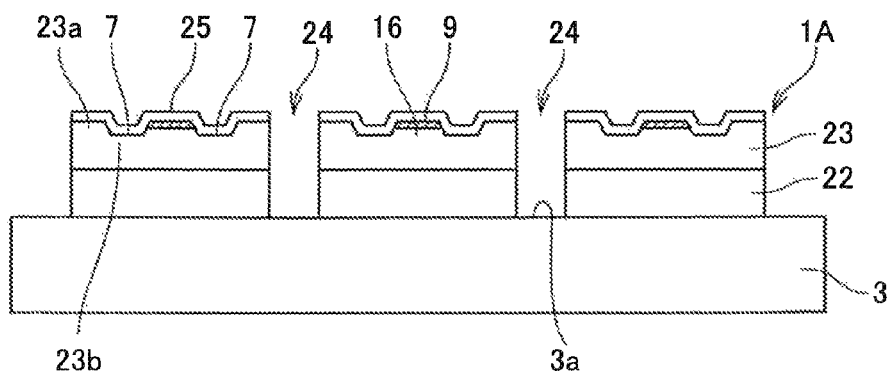
FIG. 9(b) is a cross sectional view showing a state where the upper side buffer layer is formed on the upper surface of each of the grating elements.

For example, after shaping a number of grating elements 1 on a mounting substrate 3 as shown in FIG. 8, upper side clad layers 25 each may be formed on the upper surface of an element as shown in FIG. 9. This film forming method is not specifically limited, and examples thereof include sputtering, vapor deposition, chemical vapor deposition (CVD), and metal organic chemical vapor deposition (MO CVD).

When film-forming the upper clad layer by a thin film forming method, single layer films 26A and 26B may be formed on the incident side end face and the emission side end face of the optical waveguide, respectively, by exposing the incident side end face 16a and the emission side end face 16b of each element to an atmosphere thereof. Thus, the reflection return amount on the incident side end face and the emission side end face of the optical waveguide is further reduced, and the output of light having a desired wavelength, which is emitted from the element can be further stabilized.

In the above-described example, after forming optical waveguides, and forming masks on an optical material layer, the side face and the end face of each grating element have been shaped by etching the optical material layer and the clad layer.

However, after forming a buffer layer on the optical material layer, a mask for covering an area corresponding to the grating element is formed on the buffer layer, and subsequently, the side face and the end face of each grating element may be also shaped by etching the buffer layer, the optical material layer and the clad layer. In this case as well, the same effect as described in the foregoing example can be obtained.

In a present embodiment, further, an upper side clad layer is formed on a buffer layer, and a single layer film is formed on an end face at the same time, thereby enabling reduction of reflectance on the end face. At this time, there are cases where thickness of the upper side clad layer is restricted because of depending on film thickness of the end face, and thus sufficient thickness to serve as the clad can not be obtained. The buffer layer may be served as the clad, and necessary thickness can be formed in the step of the buffer layer. For this reason, film thickness of each of the upper clad and the end face can be set to an optimum numerical value. It is required to be set to a thickness for making reflectance on the end surface to be smaller than reflectance by the gratings, and thus improvement of the grating characteristic and reduction of reflectance on the end face become possible at the same time.

An optical material layer, a clad layer, a buffer layer and an upper side clad layer each are preferably a single layer, but may be a multilayer film. Further, material of each of the clad layer, the buffer layer and the upper side clad layer is required to have smaller reflectance than that of the optical material layer, and examples thereof can include silicon oxide, tantalum oxide and zinc oxide, for example.

Further, the refractive index of the upper side clad layer is preferably equal to or lower than the refractive index of the buffer layer. Thus, reflectance of the end face can be made to be smaller than that of the optical material layer with certainty.

Figure 10:
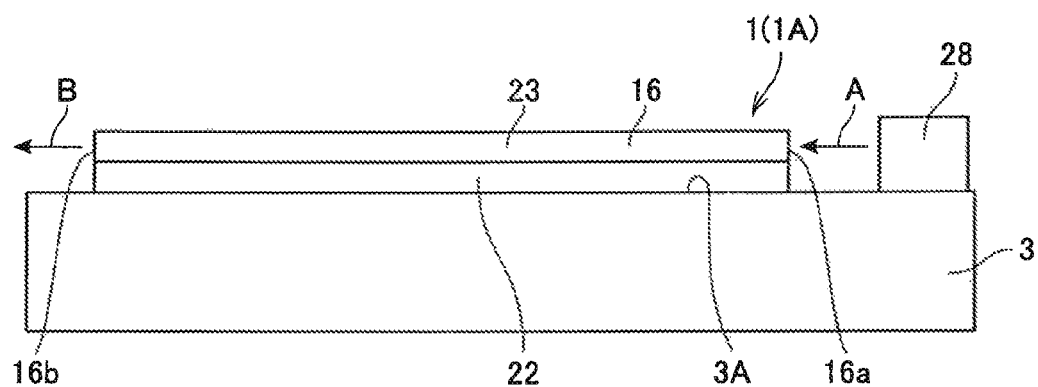
FIG. 10 shows a state where a laser light source 28 is further mounted on a mounting substrate 3.

Further, as shown in FIG. 10, the grating element 1 (or 1A) in the present example and a light source 28 may be mounted on the mounting substrate 3. Then, it is provided a light source device with which laser light having a predetermined wavelength is emitted, by performing optical axis alignment of the light source 28 and the grating element 1 (1A). In addition, the arrow A represents incident light to the element, and the arrow B represents emitted light from the element.

EXAMPLES

Example 1

The optical elements shown in FIG. 8 were produced by the method which was explained referring to FIGS. 2-8.

However, specifically, a quartz substrate was used as a mounting substrate 3. Next, a clad layer 4 was formed on the mounting substrate 3. SiO2 was used as a clad material; thickness of the clad layer was set to 1 μm; and the clad layer was formed by a sputtering method.

Next, an optical material layer 8 made of Ta2O5 was formed on the clad layer 4. Thickness of this optical material layer was set to 2 μm, and a sputtering method was applied for a film forming method.

Next, Bragg gratings 9 were formed in an optical material layer 8. That is to say, patterning of grooves and bumps at a pitch of 205 nm in a resin layer was performed by a nanoimprinting method, and the gratings 9 having a depth of 100 nm were formed by dry etching using a fluorine based gas. The length of the gratings 9 was set to 50 μm. The depth of groove portions depends on the reflection amount, but may be formed in a depth of about 100 nm for stability of the laser oscillation wavelength.

Next, as shown in FIG. 6, a pair of ridge grooves 7 were formed in the predetermined regions to form a ridge portion 16. In the present example, the width of the ridge portion was set to 3 μm, and the depth of ridge grooves was set to 1 μm. When forming the ridge grooves, after film-forming a metal mask, followed by resist coating, patterns of the ridge grooves were formed by a mask aligner, and each optical waveguide was formed by dry etching using a fluorine based gas.

Figure 7A:
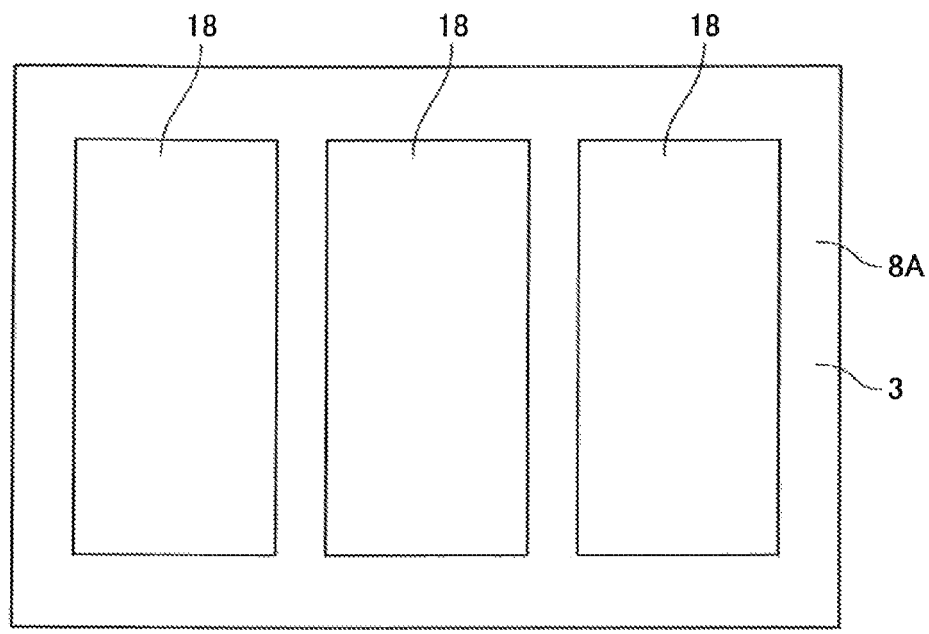
FIG. 7(a) is a plan view schematically showing a state where a mask 18 corresponding to each of grating elements is placed above an optical material layer 8A.
Figure 7B:
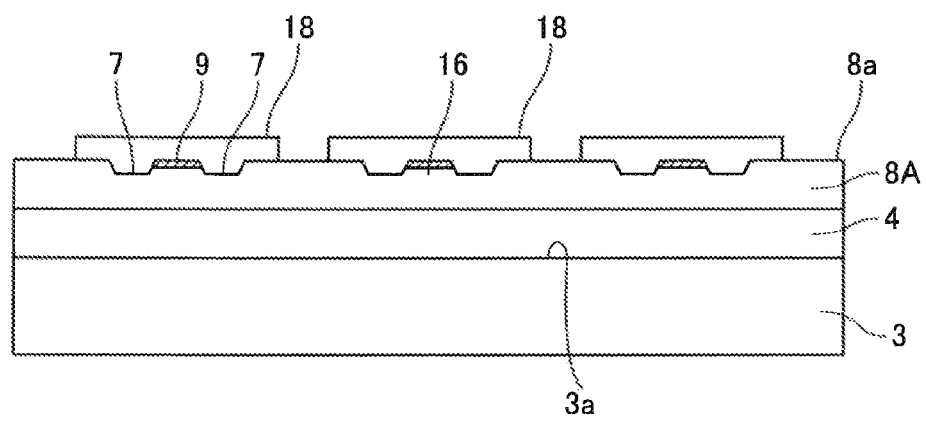
FIG. 7(b) is a cross sectional view schematically showing a state where the mask 18 corresponding to each of the grating elements is placed above the optical material layer SA.

Next, metal masks 18 as shown in FIG. 7 were film-formed, followed by resist coating; patterns each having an element length of 10 mm and a width of 2 mm were formed by a mask aligner; dry etching using a fluorine based gas is applied so as to be etched until reaching the quartz substrate to form each of the grating elements 1. It was confirmed that the incident side end face and the emission side end face of each optical waveguide had an angle of 89° or more with respect to the optical axis, and the incident side end face and the emission side end face each were mirror faces.

As to optical characteristics of the resulting grating element, output light was analyzed with an optical spectrum analyzer by inputting light to the grating element using a super luminescent diode (SLD) as a wide band wavelength light source, to evaluate reflection characteristics from transmission characteristics thereof. In consequence, characteristics of a central wavelength of 848.3 nm with respect to TE polarized light, a maximum reflectance of 15%, and a full width at half maximum LUG of 4 nm were obtained.

Further, a value of 1 dB/cm was obtained by measuring the input/output propagation loss.

Example 2

A number of grating elements were prepared on a mounting substrate 3 so as to be described in Example 1.

Next, upper side clad layers 25 each having a thickness of 250 nm, the upper side clad layers each made of SiO2 were film-formed from the upper surface side by a sputtering method. In this case, single layer films 26A and 26B each having a thickness of 79 nm had been also formed on the incident side end face and the emission side end face of the optical waveguide.

As to optical characteristics of the resulting grating element, output light was analyzed with an optical spectrum analyzer by inputting light to the grating element using a super luminescent diode (SLD) as a wide band wavelength light source to evaluate reflection characteristics from transmission characteristics thereof. In consequence, characteristics of a central wavelength of 848.3 nm with respect to TE polarized light, a maximum reflectance of 20%, and a full width at half maximum LUG of 3 nm were obtained. Further, a value of 0.8 dB/cm was obtained by measuring the input/output propagation loss.

It has become possible that a light source by which the oscillation wavelength is stabilized at a predetermined wavelength is obtained by using an element in the present example in combination with a semiconductor laser light source having a wavelength of 850 nm, for example. Further, a blue-green second harmonic generation light source (SHG), by which the output wavelength and output power were stabilized, was able to be obtained by using this element in combination with a wavelength conversion element phase matched at 848.3 nm.

Comparative example 1

A wavelength conversion element having a sub-wavelength grating structure was produced by the method which was explained referring to FIGS. 2-8.

A quartz substrate was used as a mounting substrate 3. Next, a clad layer 4 was formed on the mounting substrate 3. SiO2 was used as a clad material; thickness of the clad layer was set to 1 μm; and the clad layer was formed by a sputtering method.

Next, an optical material layer 8 made of lithium niobate was attached onto the clad layer 4 by a direct joining method, followed by precision polishing carried out until reaching 3 μm.

The sub-wavelength grating structure was formed on the optical material layer 8. Patterning of grooves and bumps at a pitch of 1.5 μm for a resin layer was carried out by a nano-imprinting method, and the sub-wavelength grating structure having a depth of 1.5 μm was formed by dry etching using a fluorine based gas. The length of the sub-wavelength grating structure was set to 8 mm.

Next, as shown in FIG. 6, a pair of ridge grooves 7 were formed in the predetermined regions to form a ridge portion 16. In the present example, the width of the ridge portion was set to 7 μm, and the depth of ridge grooves was set to 2 μm. When forming the ridge grooves, after film-forming a metal mask, followed by resist coating, patterns of the ridge grooves were formed by a mask aligner, and each optical waveguide was formed by dry etching using a fluorine based gas.

Next, metal masks 18 as shown in FIG. 7 were film-formed, followed by resist coating; patterns each having an element length of 10 mm and a width of 2 mm were formed by a mask aligner; dry etching using a fluorine based gas is applied so as to be etched until reaching the quartz substrate to form each element. It was confirmed that the incident side end face and the emission side end face of each optical waveguide had an angle of 89° or more with respect to the optical axis, and the incident side end face and the emission side end face each were mirror faces.

Semiconductor lasers having a wavelength of 780 nm, and a wavelength of 1064 nm were made incident on the resulting wavelength conversion element, and mid infrared rays having a wavelength of 2.92 μm were generated by difference frequency generation. Conventionally, this infrared light has been designed so as to be radiated in the direction of 46° by Cherenkov radiation, and Fresnel reflection at the end face is configured to be suppressed by a sub-wavelength grating structure. However, when measuring the propagation loss with respect to two input wavelengths, a value of 5 dB/cm was obtained. Thus, mid infrared rays generated by the difference frequency were suppressed, thereby resulting in lower output than that of one having no sub-wavelength grating.

That is to say, in cases where wavelength conversion elements each having a sub-wavelength grating structure were produced, no effect of the present invention was produced.

The invention claimed is:

1. A method for producing a mounting structure comprising a mounting substrate and a plurality of grating elements provided over said mounting substrate, the method comprising the steps of:
   forming a plurality of Bragg gratings at predetermined locations of a laminate comprising said mounting substrate, a clad layer provided on said mounting substrate and an optical material layer provided on said clad layer;
   forming optical waveguides each including at least each of said Bragg gratings;
   forming masks each covering a region corresponding to each of said grating elements on said optical material layer; and
   etching said optical material layer and said clad layer to shape an end face of each of said grating elements.

2. The method of claim 1, further comprising the step of forming an upper side clad layer on said optical material layer and a single layer film on said end face of said grating element, after shaping said end face of each of said grating elements.

3. The method of claim 1, wherein said optical waveguide comprises a ridge type optical waveguide, said method further comprising the step of etching said optical material layer to form ridge grooves for shaping said ridge optical waveguide.

4. The method of claim 1, further comprising the step of forming said Bragg gratings by a nanoimprinting method.

5. The method of claim 1, wherein a clearance is provided between said grating elements adjacent to each other on said mounting substrate, and wherein a surface of said mounting substrate is exposed to said clearance and comprises a flat surface.

6. A method for producing a mounting structure comprising a mounting substrate and a plurality of grating elements provided over said mounting substrate, the method comprising the steps of:
   forming a plurality of Bragg gratings at predetermined locations of a laminate comprising said mounting substrate, a clad layer provided on said mounting substrate and an optical material layer provided on said clad layer;
   forming optical waveguides each including at least each of said Bragg gratings;
   forming a buffer layer on said optical material layer after said optical waveguide is formed;
   forming masks each covering a region corresponding to each of said grating elements on said buffer layer; and
   etching said buffer layer, said optical material layer and said clad layer to shape an end face of each of said grating elements.

7. The method of claim 6, further comprising the step of forming an upper side clad layer on said buffer layer and a single layer film on said end face of said grating element, after shaping said end face of each of said grating elements.

8. The method of claim 6, wherein said optical waveguide comprises a ridge type optical waveguide, said method further comprising the step of etching said optical material layer to form ridge grooves for shaping said ridge optical waveguide.

9. The method of claim 6, further comprising the step of forming said Bragg gratings by a nanoimprinting method.

10. The method of claim 6, wherein a clearance is provided between said grating elements adjacent to each other on said mounting substrate, and wherein a surface of said mounting substrate is exposed to said clearance and comprises a flat surface.

* * * * *